United States Patent [19]

Weisbrod

[11] 4,183,062

[45] Jan. 8, 1980

[54] ROW ADDRESSING APPARATUS FOR A BISTABLE DISPLAY DEVICE

[75] Inventor: Sherman Weisbrod, Somerville, N.J.

[73] Assignee: RCA Corporation, New York, N.Y.

[21] Appl. No.: 931,745

[22] Filed: Aug. 7, 1978

[51] Int. Cl.² .............. H04N 5/66; H04N 3/12; H05B 37/00; G09F 9/00

[52] U.S. Cl. .............. 358/230; 358/24 D; 315/169.1; 340/771; 340/776; 340/793; 340/805

[58] Field of Search ............. 358/56, 59, 230, 240, 358/241; 340/726, 771, 776, 793, 805, 166 EL, 166 R; 315/169–169.4

[56] References Cited

U.S. PATENT DOCUMENTS

| | | | |
|---|---|---|---|
| 3,906,290 | 9/1975 | Kurahashi et al. | 358/230 X |
| 3,953,672 | 4/1976 | Ninke | 358/240 |
| 3,961,134 | 6/1976 | Jarvis | 358/240 |
| 3,997,719 | 12/1976 | Judice | 358/240 |
| 4,123,751 | 10/1978 | Gladstone et al. | 340/166 EL |

OTHER PUBLICATIONS

*AC Plasma Panel TV Display with 64 Discrete Intensity Levels;* Anderson and Fowler article *Digest:* 1974 S.I.D. Informational Symposium, San Diego, May 1974, furnished by applicant.

*Primary Examiner*—Robert L. Richardson
*Assistant Examiner*—Aristotelis M. Psitos
*Attorney, Agent, or Firm*—Eugene M. Whitacre; Glenn H. Bruestle; Vincent J. Coughlin, Jr.

[57] ABSTRACT

A horizontal sync signal simultaneously addresses a second counter and a first memory addressing circuit comprising a frequency multiplier connected to a first counter. The output of the first counter addresses the first memory. A comparator compares the outputs from the first memory and the second counter, and generates an output which may be compensated if necessary to subsequently assure proper sequencing of the display device. The comparator output addresses a second memory. Outputs from the second memory and the second counter are combined in an adder and the summation thereof are fed into a subtractor along with the output of the first memory. The output of the subtractor is fed into a binary-to-decimal converter which in turn feeds a row electrode driver circuit.

8 Claims, 3 Drawing Figures

ROW ADDRESSING APPARATUS FOR A BISTABLE DISPLAY DEVICE

BACKGROUND OF THE INVENTION

The present invention relates to bistable image display devices and more particularly to systems for addressing the row electrodes of the display device for duty cycle modulation.

Bistable display devices, such as matrices of gas discharge cells or electroluminescent devices, are well known within the display arts. A gas discharge display panel of this type is disclosed in U.S. Pat. No. 3,879,634 entitled "Manufacture and Operation of Gas Discharge Panel" issued on Apr. 22, 1975 to L. V. Pfaender et al. This panel comprises a plurality of individual image display cells arranged in an X-Y matrix. The individual cells are bistable in that they have only an on-off state without the capability of regulating the emitted light intensity. In the display of an image, the individual cells are sequentially addressed by an X-Y addressing scheme.

One of the difficulties encountered in adapting this type of display to television purposes is achieving gray scale or individual element brightness control. A conventional approach to achieving gray scale in bistable devices is to control the duty cycle of the individual cell. Specifically, the individual cell is turned on for a portion of the frame time of the image display which corresponds to the illumination level of the gray scale at that particular picture element. Sixty-four different brightness levels will provide sufficient brightness variation for television application. One method of achieving these various brightness levels for NTSC television is to divide the frame interval (33.4 Milliseconds) into six intervals corresponding to 8, 16, 32, 64, 128, and 256 horizontal line intervals. By proper selection of one or a combination of these six intervals, the 64 discrete brightness levels may be obtained. The necessary circuitry for controlling the various individual display cells to achieve gray scale using this technique has been fairly complex. The present invention seeks to simplify the addressing circuitry for achieving gray scale by duty cycle modulation.

SUMMARY OF THE INVENTION

Duty cycle modulation for achieving gray scale in a bistable image display device can be accomplished by a simplified row addressing apparatus. The horizontal sync component of an incoming video signal simultaneously addresses a second counter and a first memory addressing device. A comparator compares the outputs from the first memory and the second counter and generates an output. The comparator output addresses a second memory, the output of which provides an input of an adder. The other adder input is provided by the output of the second counter. The summation output of the adder is connected to one input of the subtractor and the other input of the subtractor is connected to the output of the first memory. A row electrode driver circuit biases the row electrodes.

DETAILED DESCRIPTION OF THE PREFERRED EMBODIMENT

Figure 1:
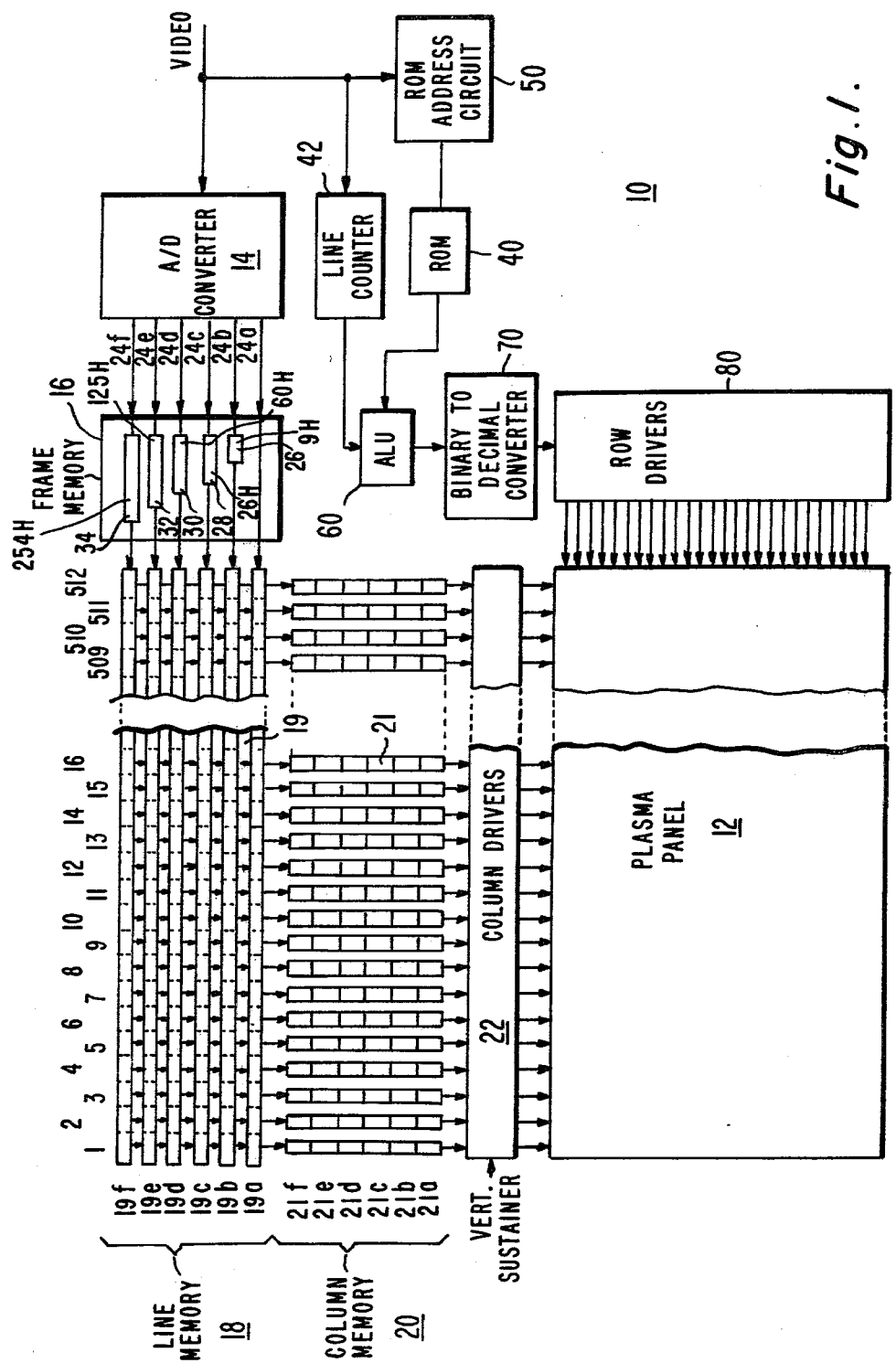
FIG. 1 is a schematic diagram of the circuitry for driving a bistable image display apparatus.

With initial reference to FIG. 1, a display device 10, comprises a matrix display panel 12, a column addressing and driving circuit and a line addressing and driving circuit. The display panel 12 in the preferred embodiment is a conventional plasma discharge device formed by an X-Y array of plasma discharge cells. However, the present invention is adaptable to other types of bistable displays. The individual cells in the plasma panel 12 are addressed by selecting the corresponding column and row electrodes of the display panel which intersect at the given display element. By proper biasing of the row and column electrodes, a gas discharge is initiated at the given display element. The image may be presented by sequentially addressing all of the display elements of the device.

The column addressing and driving circuit comprises an analog to digital (A/D) converter 14, a shift register frame memory 16, a line memory 18, a column memory 20 and column drivers 22. The input terminal of the A/D converter 14 is connected to the composite video signal for the display device. The A/D converter 14 digitizes the brightness signal of the incoming composite video signal into a six-bit digital number which is coupled to the input terminal of the shift register frame memory 16 by six connection lines 24a–24f. Each digital number represents the brightness signal for a given picture element. The frame memory 16 contains five shift registers 26, 28, 30, 32, and 34 having different numbers of stages for delaying the bits of a digital number from the A/D converter 14 varying amounts of time. The least significant bit on line 24a is directly coupled to the output of the frame memory 16. The next most significant bit on line 24b is connected to a first shift register 26 which delays that bit 9 horizontal line scan intervals (9H). The next most significant bit on line 24c is connected to a second shift register 28 which delays that bit 26 horizontal line scan intervals. The fourth most significant bit on line 24d is coupled to a third shift register 30 which provides a 60 horizontal line scan period delay before passing that bit of information to the output of the frame memory 16. The fifth bit on line 24e is connected to the fourth shift register 32 which delays that bit for 125 horizontal line scan periods. The most significant bit on line 24f is delayed 254 horizontal line scan intervals by the fifth shift register 34.

Figure 2:
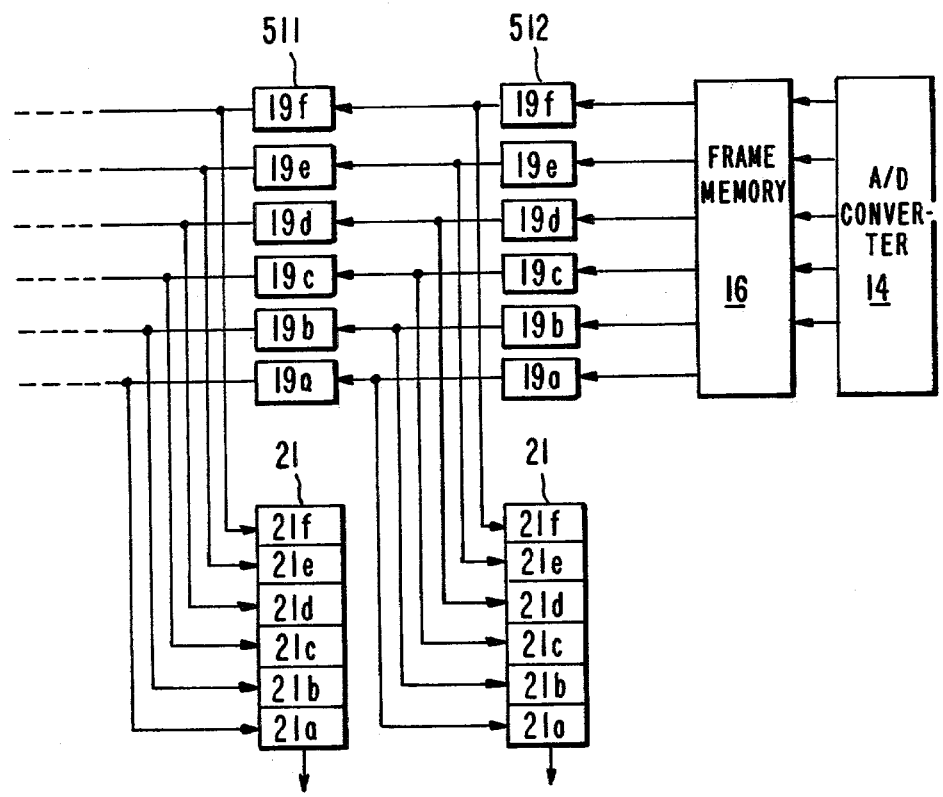
FIG. 2 is a more detailed schematic diagram of a portion of the circuitry in FIG. 1.

The six bit delayed output from the shift registers 26, 28, 30, 32, and 34 of the frame memory 16 are coupled to the inputs of the line memory 18. The line memory consists of six serial-in/parallel-out shift registers 19a–19f having one storage location for each column of the display panel 12. One shift register 19 is connected to one of the bit output lines of the frame memory 16. For example, in a device adapted for the display of television information, sufficient monochrome resolution can be obtained by a display panel having 512 columns and therefore having a line memory 18 with six 512 stage shift registers 19a–19f. Connected to the line memory 18 is a column memory 20 consisting of a six stage parallel-in/serial-out shift register 21 for each column of the display panel 12 as shown in detail in FIG. 2. The parallel output from the stages of each of the line memory shift registers 19a–19f, corresponding to a column of the display panel 12, are connected in parallel to the parallel inputs of one columns memory shift register 21. The serial output of each of the column memory shift registers 21 is connected to the column driver 22, to control the voltage applied to each column electrode of a plasma panel 12. The column driver 22 may be a plurality of transistor switches each connected to a separate column electrode of the panel 12 for applying a bias voltage to the column electrode in response to the column memory output. The interconnection of the line memory 18 and the column memory 20 will be elaborated upon in the description of the operation of the device below.

With reference to FIG. 1, the row address circuit comprises a read only memory (ROM) 40 with its associated address circuit 50, a line counter 42, an arithmetic logic unit (ALU) 60, a binary-to-decimal converter 70 and a row driver circuit 80.

Figure 3:
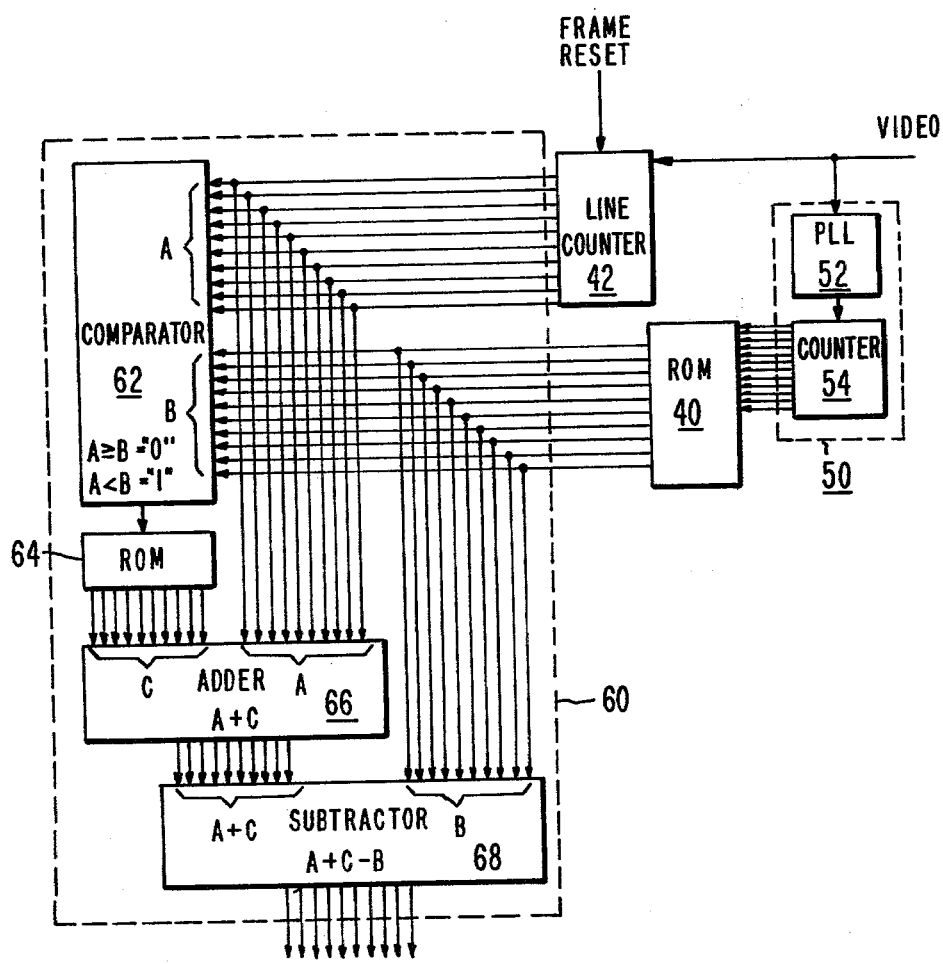
FIG. 3 is a detailed schematic diagram of the circuitry for addressing part of the apparatus.

As shown in detail in FIG. 3, the video signal is connected to the line counter 42 which may be a ten stage binary counter for counting the horizontal sync signal pulse in the video signal (525 for an NTSC television signal). The output of the line counter 42 is a binary count of the line of video information which also is being sent to the analog to digital converter 14. The ROM address circuit 50 includes a phase locked loop (PLL) 52 with its input connected to the video information signal. The phase locked loop 52 multiplies the horizontal sync signal frequency by twelve, generating twelve output pulses per horizontal sync pulse. The output terminal of the phase locked loop 52 is connected to the input terminal of a divide-by-twelve counter 54. The divide-by-twelve counter 54 converts each of the twelve pulses from the phase locked loop generated during each horizontal interval into an address pulse on each of the twelve output terminals. After the counter 54 has reached twelve, the next input pulse resets the counter to one. The output terminal of the divide-by-twelve counter 54 is connected to the addressing input terminal of the ROM 40.

The arithmetic logic unit 60 comprises a comparator 62, a comparator ROM 64, an adder 66 and a subtractor 68, as shown in FIG. 3. One input terminal of the comparator 62 is connected to the output terminal of the line counter 42 and the other input terminal of the comparator 62 is connected to the output of the ROM 40. The comparator 62 compares the output, A, of the line counter 42 with the output B of the ROM 40. The output terminal of the comparator 62 is connected to the addressing input of the comparator ROM 64. The comparator ROM 64 has two storage locations; one containing the binary number zero, and the other containing the binary number 525. The output from the comparator ROM 64 is connected to one input terminal of the adder 66. The other input terminal of the adder 66 is connected to the output of the line counter 42. The summing output terminal of the adder 66 is connected to the minuend input terminal of the subtractor 68. The subtrahend input terminal of the subtractor 68 is connected to the output terminal of the ROM 40. The output of the subtractor 68 is a binary representation of the difference between the output of the adder 66 and the addressed contents of the ROM 40.

The output of the subtractor is connected to the input of the binary-to-decimal converter 70, as shown in FIG. 1. The output of the binary-to-decimal converter 70 is used to bias the row driver circuit 80. The row driver circuit 80 may take any of several conventional forms capable of utilizing the decimal output of the binary-to-decimal converter 70 to address the individual row electrodes of the plasma panel. For example, the row driver 80 may comprise a plurality of transistor switches each associated with each row electrode such that the output of the binary-to-decimal converter 70 turns on and off each of these transistor switches.

As noted previously, gray scale modulation is achieved by varying the time period during which an individual gas display cell is turned on. By dividing the frame time period into six subintervals of 8, 16, 32, 64, 128, and 256 horizontal line scan periods, combinations of these six intervals can generate sixty-four different brightness levels. Therefore, each display line is addressed six times with a write pulse during the frame interval and correspondingly erased six times during that same period so as to generate the six intervals of varying duration. The present apparatus presents a novel row addressing or selection system to turn on display elements for varying amounts of time. This coupled with the synchronized clocking of the column address information, properly addresses the individual elements of the panel.

The incoming video information is converted by the A/D converter 14 into a six bit digital number representing the brightness level for each picture element of the display. The video signal is a conventional "dot sequential" signal wherein the information for the various picture elements is serially transmitted. The different bits of the digital number are delayed in the frame memory 16 varying amounts of time corresponding to one horizontal line period less than the amount of time in each of the six addressing periods. The reason for the shorter length of delay is that another horizontal line period is consumed by the transfer of information between the line and column memories 18 and 20, respectively, as will become apparent later. The least significant bit on line 24a passes directly through the frame memory 16 while each of the more significant bits gets delayed 9, 26, 60, 125 and 254 horizontal line periods (H) respectively. The output of each of the delay shift registers 26, 28, 30, 32 and 34 of the frame memory 16 is coupled to the input of the six-bit-by-512-bit line memory 18. Each of the six shift registers 19a–19f store a full horizontal line of bits from the output of the frame memory.

For example, when the 255th horizontal line of video information is being digitized by the A/D converter 14, the first line memory shift register 19a is storing the least significant bit of that digitized information. The next line memory shift register 19b is storing the second bits for the 246th line (255-9) of the display and the next shift register 19c is storing the bits corresponding to the 229th line of video information. The remaining shift registers 19d–19f are storing the bits of digitized information for the 195th, 130th, and the 1st lines of video information, respectively. During the horizontal retrace period of the 255th line, the contents of each of the line memory shift registers 19 is transferred in parallel into the column memory 20 so that the six bits in the line memory shift register associated with a given column are transferred into the corresponding shift register 21 of the column memory 20. The first stage 21a of each column shift register 21 contains the bit of information corresponding to the least significant bit of the brightness signal for the 255th line. The next column shift register stage 21b contains the second bit of visual information for the 246th display line and so on, so that the last or sixth column shift register stage 21f contains the most significant bit of the digitized video information for the first display line. Six times during the 256th horizontal line interval the information is clocked out of the column memory in a serial fashion into the column drivers. The line and column memories 18 and 20 respectively convert the "dot sequential" signal into a "line sequential" signal so that an entire line of display information may be simultaneously presented.

At the same time that the video information is being clocked through the column address circuit, the row select or address circuit is addressing six lines of the display with a write pulse and another six lines with an erase pulse. For example, with respect to FIG. 3, when the 256th line of video information is being digitized by the A/D converter, the contents of the line counter 42 is 256. The contents of the ROM memory 40 is shown in the following table.

| Memory Location | Write or Erase | Contents of Location |
| --- | --- | --- |
| 1 | W | 1 |
| 2 | E | 125 |
| 3 | W | 10 |
| 4 | E | 254 |
| 5 | W | 27 |
| 6 | E | 511 |
| 7 | W | 61 |
| 8 | E | 9 |
| 9 | W | 126 |
| 10 | E | 26 |
| 11 | W | 255 |
| 12 | E | 39 |

The first pulse from the phase locked loop 52 is converted to digital by the divide-by-twelve counter 54 and addresses the first storage location which contains the number one. The comparator compares the one with respect to the line count and since the line count (A=256) is greater than or equal to the output of the ROM (B=1) the output of the comparator will be a zero. This output causes the comparator ROM 64 to be addressed to the location having the binary zero stored in it. The comparator ROM output (C) is then transferred to the adder 66 where it is combined with the line count (A) from the counter 42 producing the number 256. The sum of the adder 66 (A+C) is then transferred to the subtractor along with the contents of the ROM 40 (B). The subtractor subtracts the contents (B) of the ROM 40 from the sum of the adder 66 (A+C) producing the number 255 (256-1). This number 255, represents the next line to be written on the display and corresponds to the line of information contained in the first stage of the column memory 20.

The number of the line to be addressed is converted into a decimal number by the binary-to-decimal converter 70, and the corresponding row driver 80 for the 255th line is addressed. At this point in time, the contents of the first stage of the column memory 20 controls the columns drivers 22. If the bit in a given column memory is a one, the column driver associated with that column memory will be turned on and if the contents of that stage of the column memory 20 is a zero, the column driver associated therewith will remain off. After being addressed, a given element of the plasma panel will remain on due to the sustainer voltage until an erase pulse is applied to the corresponding row electrode.

The second pulse from the phase locked loop 52 addressed the second storage location of the ROM 40 containing the number 125. The same sequence is repeated by the arithmetic logic unit 60 and the output of the subtractor (256-125) addresses the 131st row with an erase pulse to turn off that previously addressed row. The next pulse from the phase locked loop addresses the third storage location of the ROM which contains the number ten. The arithmetic logic unit 60 subtracts the ten from the line count 256 to address line 246. At the same time, the contents of the column memory shift registers 21 is clocked out so that the first stage 21a contains the video information for the 246th lines. The remaining nine locations of the ROM 40 are addressed to write or erase nine other rows. At the completion of the twelfth cycle, a new horizontal sync pulse appears at the input to the line counter 42 incrementing that counter to 257. The phase locked loop transmits a new pulse initializing the divide-by-twelve counter 54 to one, and the contents of the line memory 18 is transferred into the column memory 20 and a new set of twelve lines are addressed with either write or erase pulses.

One of the problems that becomes apparent is that if the line count is less than the contents of the ROM 40, pure subtraction of the ROM 40 from the line count will produce a negative number which will not produce proper sequencing of the display. For example, if the contents of the line counter 42 is the number five, the second pulse in a chain of twelve from the phase locked loop 52 will address the second location in the ROM 40 containing the number 125. Therefore, a pure subtraction of the two would yield a negative 120. The ALU 60 compensates for this situation. The comparator 62 realizing that the line count, A, is less than the contents B of the ROM 40, generates a one which addresses the second location of the comparator ROM 64 containing a digital representation of the number 525 (the total number of lines in an NTSC frame). The adder then adds the line count to the output of the comparator ROM 64 (5+525) producing the number 530. The contents of the ROM 64 is then subtracted from the output of the adder 66 (530-125) generating the next line to be erased (405).

The present line address circuit enables the proper addressing of all 525 lines so as to generate the six intervals of time to provide the 64 levels of brightness of the display device. The addressing of the row electronics is accomplished with minimal memory as compared with prior devices.

I claim:
1. A device for addressing row electrodes in a bistable image display apparatus capable of displaying a television signal having a horizontal sync signal comprising:
 a first memory device having address locations and having an addressing input terminal and an output terminal for the contents of said address locations;
 means for addressing the first memory device with the horizontal sync signal;
 a second counter having an input terminal addressed by the horizontal sync signal for counting the pulses of said sync signal, the second counter having an output terminal;
 a comparator having one input terminal connected to the output of the second counter and another input terminal connected to the output of the first memory for comparing the contents of the first memory to the count of the counter, the comparator also having an output terminal;
 a second memory having an addressing input terminal connected to the output terminal of the compara- tor, the second memory also having a memory contents output terminal;

an adder having input terminals connected to the output terminal of the second counter and to the output terminal of the second memory, for summing the count of the second counter with the contents of the second memory, the adder having a summation output terminal;

a subtractor having a first input terminal connected to the output terminal of the adder and a second input terminal connected to the output terminal of the first memory, the subtractor also having an output terminal; and a row electrode drive circuit for biasing the row electrodes.

2. The device as in claim 1 wherein the memory address means addressed by the horizontal sync signal comprises:

a frequency multiplier having an input terminal connected to receive the horizontal sync signal for the display apparatus and having an output terminal so as to produce a signal on the output terminal having a frequency which is greater than the horizontal sync signal frequency; and a first counter having an input terminal connected to the output terminal of the frequency multiplier and having an output terminal connected to the addressing input terminal of the first memory.

3. The device as in claim 1 wherein the first and second memories are binary storage devices, and the row electrode driver circuitry comprises a binary-to-decimal converter.

4. An image display device responsive to a composite dot sequential video signal containing a brightness signal and a horizontal sync signal comprising:

a display panel including a matrix of bistable light emitting devices arranged in columns and rows with column electrode and row electrodes for addressing each emitting device;

a column electrode address circuit comprising:
(a) an analog to digital converter for digitizing the brightness signal into a plurality of bits,
(b) means for delaying the different bits of the brightness signal various amounts of time,
(c) means for converting the dot sequential digitized brightness signal into a line sequential signal;

a column electrode driver circuit for biasing the column electrodes in response to the line sequential signal and a row electrode address circuit comprising:
(a) a first memory device having an addressing input terminal and an output terminal for the contents of the address locations;
(b) means for addressing the first memory device in response to the horizontal sync signal;
(c) a second counter having an input terminal for receiving the horizontal sync signal and for counting the pulses of that signal, the second counter having an output terminal;
(d) a comparator having one input terminal connected to the output of the second counter and another input terminal connected to the output of the first memory for comparing the contents of the first memory to the count of the second counter, the comparator also having an output terminal;
(e) a second memory having an addressing input terminal connected to the output terminal of the comparator so as to be addressed by the comparator output, the second memory also having a memory contents output terminal;
(f) an adder having input terminals connected to the output terminal of the second counter and to the output terminal of the second memory, for summing the count of the second counter with the contents of the second memory, the adder having a summation output terminal;
(g) a subtractor having a first input terminal connected to the output terminal of the adder and a second input terminal connected to the output terminal of the first memory for subtracting the contents of the first memory from the output of the adder, the subtractor also having an output terminal; and
(h) a row electrode driver circuit for biasing the row electrodes in response to the output of the subtractor.

5. The device as in claim 4 wherein the memory address means addressed by the horizontal sync signal comprises:

a frequency multiplier having an input terminal connected to receive the horizontal sync signal for the display apparatus and having an output terminal so as to produce a signal on the output terminal having a frequency which is greater than the horizontal sync signal frequency; and a first counter having an input terminal connected to the output terminal of the frequency multiplier and having an output terminal connected to the addressing input terminal of the first memory.

6. The device as in claim 5 wherein the first and second memories are binary storage devices and the row electrode driver circuitry comprises a binary-to-decimal converter.

7. The device as in claim 4 wherein the column electrode address circuit delaying means comprises a plurality of shift registers having different number of stages, connected to the analog to digital converter and an output terminal, each shift register delays a bit of the digitized brightness signal.

8. The device as in claim 7 wherein the line sequential converting means comprises:

a line memory having a serial-in/parallel-out shift register having an input terminal connected to the output terminal of the delaying means and a storage for each column electrode with a parallel output terminal for each stage; and a column memory having a plurality of shift registers each having a terminal connected to a different parallel output of the line memory and an output terminal connected to the column electrode driver circuit.

* * * * *

UNITED STATES PATENT AND TRADEMARK OFFICE
CERTIFICATE OF CORRECTION

PATENT NO. : 4,183,062

DATED : January 8, 1980

INVENTOR(S): Sherman Weisbrod

It is certified that error appears in the above-identified patent and that said Letters Patent is hereby corrected as shown below:

Title Page, Col. 2, Line 1   "informational Symposium" should be --International Symposium--

*Signed and Sealed this*

*Twelfth* Day of *August 1980*

[SEAL]

*Attest:*

SIDNEY A. DIAMOND

*Attesting Officer*     *Commissioner of Patents and Trademarks*